(12) United States Patent
Cormack

(10) Patent No.: US 6,795,654 B2
(45) Date of Patent: Sep. 21, 2004

(54) TUNABLE ADD/DROP FILTER

(76) Inventor: Robert H. Cormack, 5305 Holmes Pl., Boulder, CO (US) 80303

( * ) Notice: Subject to any disclaimer, the term of this patent is extended or adjusted under 35 U.S.C. 154(b) by 611 days.

(21) Appl. No.: 09/955,359

(22) Filed: Sep. 18, 2001

(65) Prior Publication Data

US 2003/0053747 A1 Mar. 20, 2003

(51) Int. Cl.[7] ............................................. H04J 14/02
(52) U.S. Cl. .............................. 398/85; 398/83; 385/24
(58) Field of Search ........................... 398/85, 84, 83; 359/308; 385/24

(56) References Cited

U.S. PATENT DOCUMENTS

| | | | |
|---|---|---|---|
| 4,813,756 A | 3/1989 | Fenkel et al. | 350/96.18 |
| 5,193,027 A | 3/1993 | Preston | 359/566 |
| 5,363,228 A | 11/1994 | DeJule et al. | 359/117 |
| 5,481,402 A | 1/1996 | Cheng et al. | 359/498 |
| 5,504,608 A | 4/1996 | Neeves et al. | 359/124 |
| 5,812,291 A | 9/1998 | Bendelli et al. | 359/129 |
| 5,917,626 A | 6/1999 | Lee | 359/131 |
| 5,949,801 A | 9/1999 | Tayebati | 372/20 |
| 6,040,944 A | 3/2000 | Pan et al. | 359/590 |
| 6,088,166 A | 7/2000 | Lee | 359/654 |
| 6,122,301 A | 9/2000 | Tei et al. | 372/32 |
| 6,285,810 B1 * | 9/2001 | Fincato et al. | 385/24 |
| 2003/0179972 A1 * | 9/2003 | Gerlach et al. | 385/1 |

FOREIGN PATENT DOCUMENTS

| | | | | |
|---|---|---|---|---|
| EP | 0903616 | 3/1999 | | 1/225 |
| JP | 10324037 | 5/2000 | | G02B/5/28 |
| WO | 9804954 | 2/1998 | | 1/313 |

OTHER PUBLICATIONS

Haschberger et al., "Michelson Interferometer with a rotating retroreflector" Applied OpticsVol. 29: No. 28 (Oct. 1, 1990, p.4216.

M. Kuznetsov, "Cascaded Coupler Mach–Zehnder Chammel Dropping Filters for Wavelength–Divison–Multiplexed Optical Systems" Journal Of Lightwave Technology, vol. 12, No. 2, (Feb. 1994. p. 226–230 XP 000676152.

* cited by examiner

Primary Examiner—Kinfe-Michael Negash
(74) Attorney, Agent, or Firm—Jennifer L. Bales; Macheledt Bales & Heidmiller

(57) ABSTRACT

A precise, tunable, low loss add/drop filter for use in fiber optic communication systems utilizes a cascaded system of Mach Zender-like stages, along with reflective elements to return passed channels to the output pass+add signal while transmitted signal(s) appear at the drop port. The optional add signal follows the reverse path of the drop signal and is added to the pass signal.

23 Claims, 8 Drawing Sheets

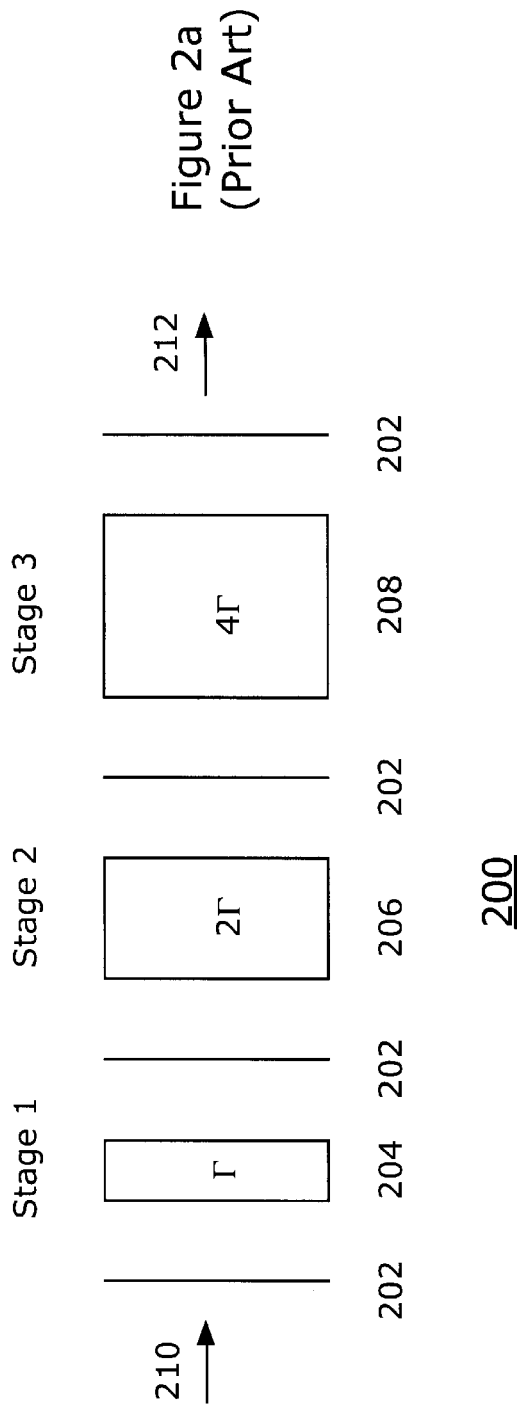
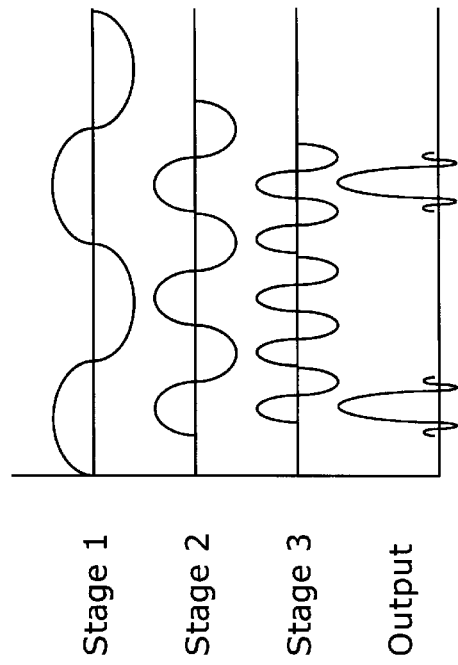

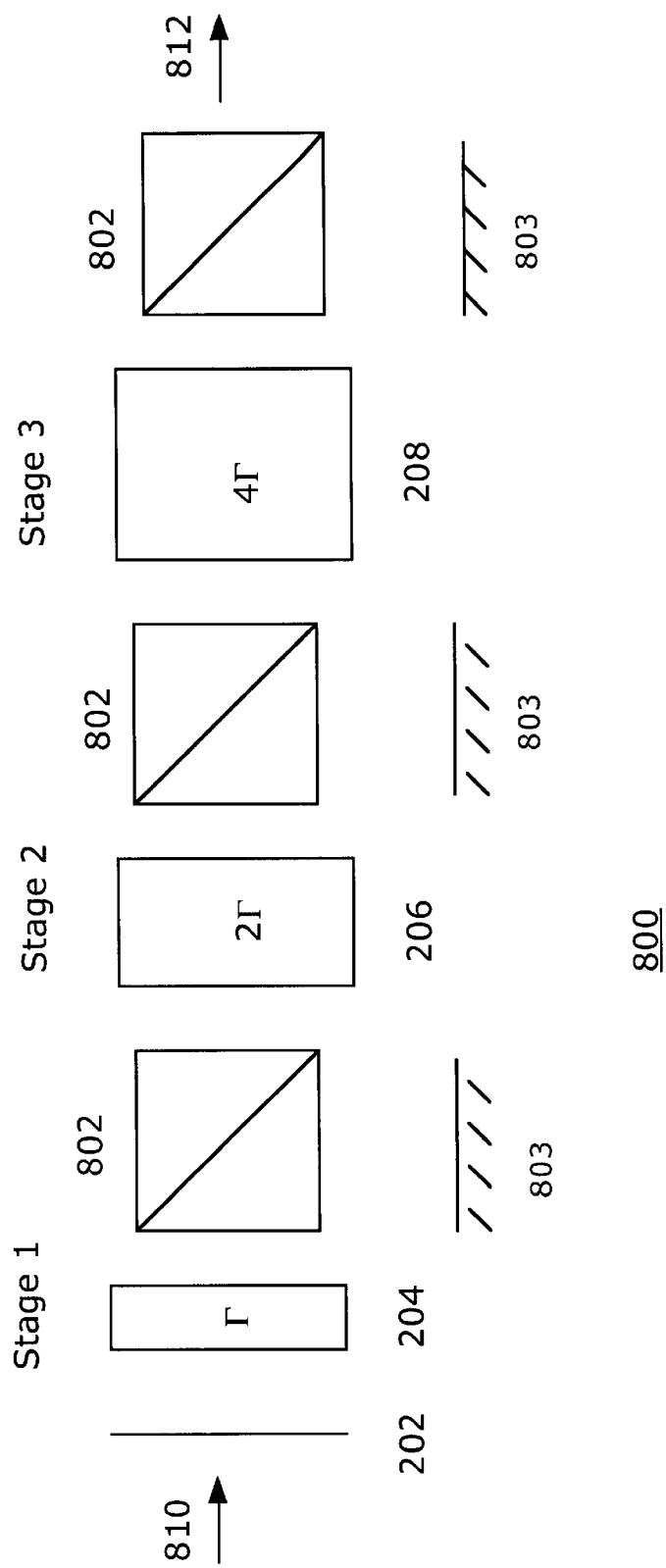

TUNABLE ADD/DROP FILTER

BACKGROUND OF THE INVENTION

1. Field of the Invention

The present invention relates to tunable optical filters. In particular, the present invention relates to tunable optical add, drop, and add/drop filters.

2. Description of the Prior Art

Optical fiber communications systems are theoretically capable of extremely high data rates (terabits per second), meaning that many channels of gigabit rate data can theoretically be carried on a fiber, via wavelength division multiplexing. The utility of fiber optic systems has been limited, however, because of the cost and complexity of the electronics required to separate out a specific wavelength channel or channels at every node in the communications system. Currently, optical add/drop filters are used to extract desired frequencies. FIG. 1 (prior art) shows a conventional fixed-wavelength optical add/drop filter system 100, based on a thin-film interference filter 108.

An add/drop filter 100 such as that shown in FIG. 1, which extracts (drops) and reinserts (adds) a fixed wavelength. A multiplexing filter system which drops and adds four fixed wavelengths is many thousands of dollars. In the future, when fibers may carry as many as 256 wavelengths, the cost of an add/drop multiplexor might be $1 million or more.

Since most nodes in add/drop multiplexor will not need to extract all of the wavelengths, much of the hardware will be idle most of the time. Yet configuring an add/drop filter to extract only particular wavelengths precludes any flexibility at the node.

Recent progress in tunable lasers has produced communication quality lasers which are capable of precise tuning across the entire fiber communication band. This removes the expense of providing dedicated lasers for each channel at each node. The obvious companion to the tunable laser would be a tunable filter, which can drop and add any given wavelength on the fiber. In addition, it would be desirable if the tunable filter could also act as a monitor for the tunable laser so that it could be accurately locked to the dropped channel wavelength. Each node would require only as many tunable laser/tunable filter sets as the maximum number of channels to be read at that node.

Unfortunately, the universal, tunable, drop/add filter described above does not exist. Current drop/add multiplexor filters capable of handling the required close wavelength spacing either use dedicated filters for each channel, or use a cascade of band-splitting filters which result in a separate output fiber for each wavelength. Both methods require network designers to either limit the node's usable wavelengths or use redundant hardware.

Tunable filters of the Fabry-Perot type are available, but it is not currently feasible to achieve the necessary degree of finesse in these filters. If they can tune the entire WDM range, they do not have narrow enough channels, and if they have narrow enough channels, they can only tune over a portion of the required band. For systems which will require 256 channels, finesse of over 250 is required. A Fabry-Perot filter with this kind of finesse would require very uniform and high reflectivity mirrors, and would be very susceptible to environmental effects such as temperature changes and vibration.

FIG. 2a (prior art) shows a 3-stage Lyot filter 200. Lyot filters were invented in 1933, and are known for achieving a high degree of finesse. The finesse of a Lyot filter increases as $2^N$, where N is the number of filter stages. Lyot filters having finesse of over 250 are easily achievable.

Referring to the example Lyot filter of FIG. 2a and the frequency plot of FIG. 2b, the operation as follows. The first polarizer 202 polarizes input light 210. Stage 1, comprising delay block 204 and a polarizer 202, passes half of the channels, while discarding the other half. So, for example, the area above the line is passed, while the area below the line is absorbed by the polarizer. Stage 2, comprising delay block 206 and a polarizer 202, does the same thing with the light it receives, passing half of those channels and discarding the other half. Stage 3, comprising delay block 208 and a final polarizer 202, passes half of the channels it receives and discards the other half. Thus, the output light is the light passed through all three stages. The output bands are much narrower than the bands passed by the first stage, but are separated by as much as the centers of the bands passed by the first stage. Further stages make the output bands narrower.

Unfortunately, the Lyot filter has several significant downsides. First, it requires polarized light, so half of the light is lost up front. Second, there is no complementary output—the light removed at each stage is discarded at the polarizers 202. A 9 stage filter results in a loss of more than 4 dB. Thus, Lyot filters have primarily been used in solar studies, where plenty of light is available and high finesse is essential.

The high finesse of a Lyot filter, without its corresponding loss of light and lack of a complimentary output, would be ideal for use in fiber optic system add/drop filters and multiplexors.

A need remains in the art for a precise, tunable, low loss add/drop filter for use in fiber optic communication systems.

SUMMARY OF THE INVENTION

It is an object of the present invention to provide a precise, tunable, low loss add/drop filter for use in fiber optic communication systems. This object is accomplished with a cascaded system of tunable filters.

A tunable drop filter according to the present invention has an input port, a drop port, and an output port and includes means for providing an input signal consisting of channels to the input port, a plurality of filter stages connected to the input port, each filter stage operating to selectively transmit either even or odd channels and reflect either odd or even channels respectively, means for providing reflected channels as a pass signal at the output port, and means for providing a transmitted channel at the drop port.

Each filter stage could comprise a fiber Mach Zender interferometer having a selective delay for transmitting the selected channels and a mirror for reflecting channels not transmitted by the fiber Mach Zender interferometer. The means for providing reflected channels as a pass signal at the output port and the means for providing an add signal at the add port such that the add signal follows the reverse path of the drop signal could comprise circulators.

As a feature, each filter stage could include a delay applied to any reflected channels, each delay selected to synchronize the pass signal channels.

As an alternative, each stage could comprise a bulk optics Mach Zender interferometer having a selective delay for transmitting the selected channels and a mirror for reflecting channels not transmitted by the bulk optics Mach Zender interferometer.

Or, each stage could comprise a selective delay block, a polarizing beam splitter adjacent to the delay block for transmitting the selected channels, and a mirror for reflecting channels not transmitted by the polarizing beam splitter.

A tunable add/drop filter according to the present invention has an input port, an output drop port, an input add port and an output pass+add port and includes means for providing an input signal consisting of channels to the input port, a plurality of filter stages connected to the input port, each filter stage operating to selectively transmit either even or odd channels and reflect either odd or even channels respectively, means for providing reflected channels as a pass signal at the output port, means for providing a transmitted channel at the drop port, means for providing an add signal at the add port such that the add signal follows the reverse path of the drop signal; and means for combining the add signal and the pass signal at the pass+add output port.

BRIEF DESCRIPTION OF THE DRAWINGS

FIG. 2 (prior art) shows a Lyot filter.

FIG. 8 shows a fifth embodiment of of a tunable add/drop filter according to the present invention, comprising a modified Lyot filter.

DETAILED DESCRIPTION OF THE PREFERRED EMBODIMENTS

Figure 1:
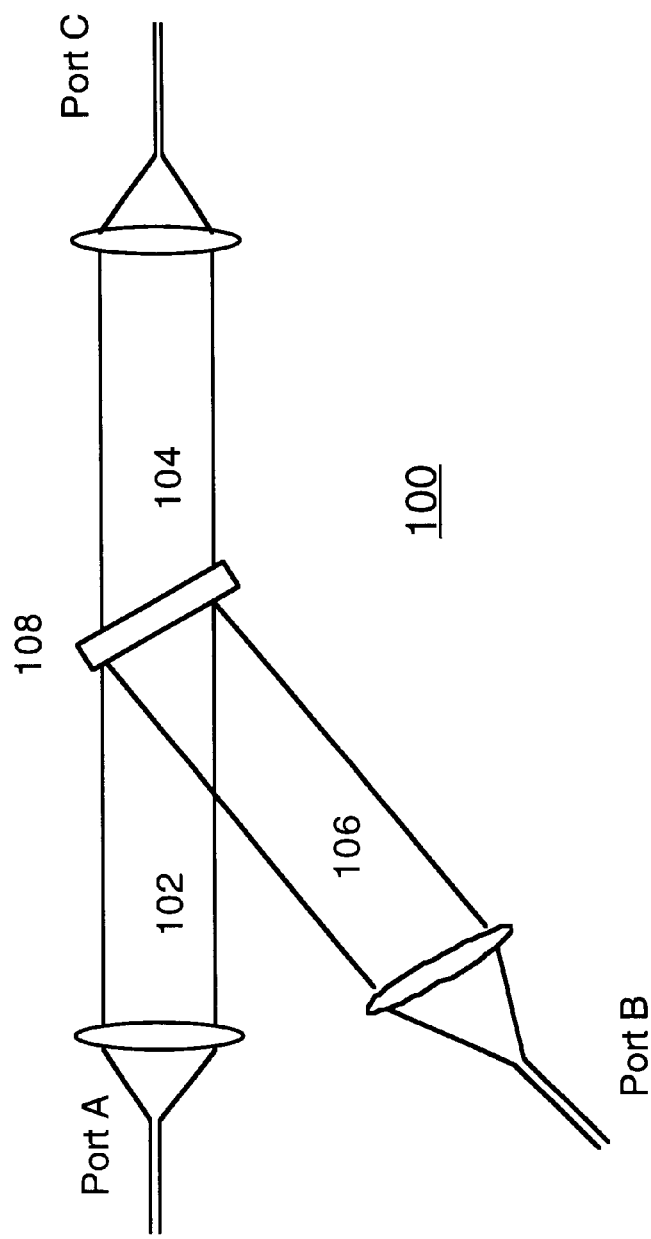
FIG. 1 (prior art) shows a conventional optical add/drop filter system for use in fiber optic communications systems.
Figure 3:
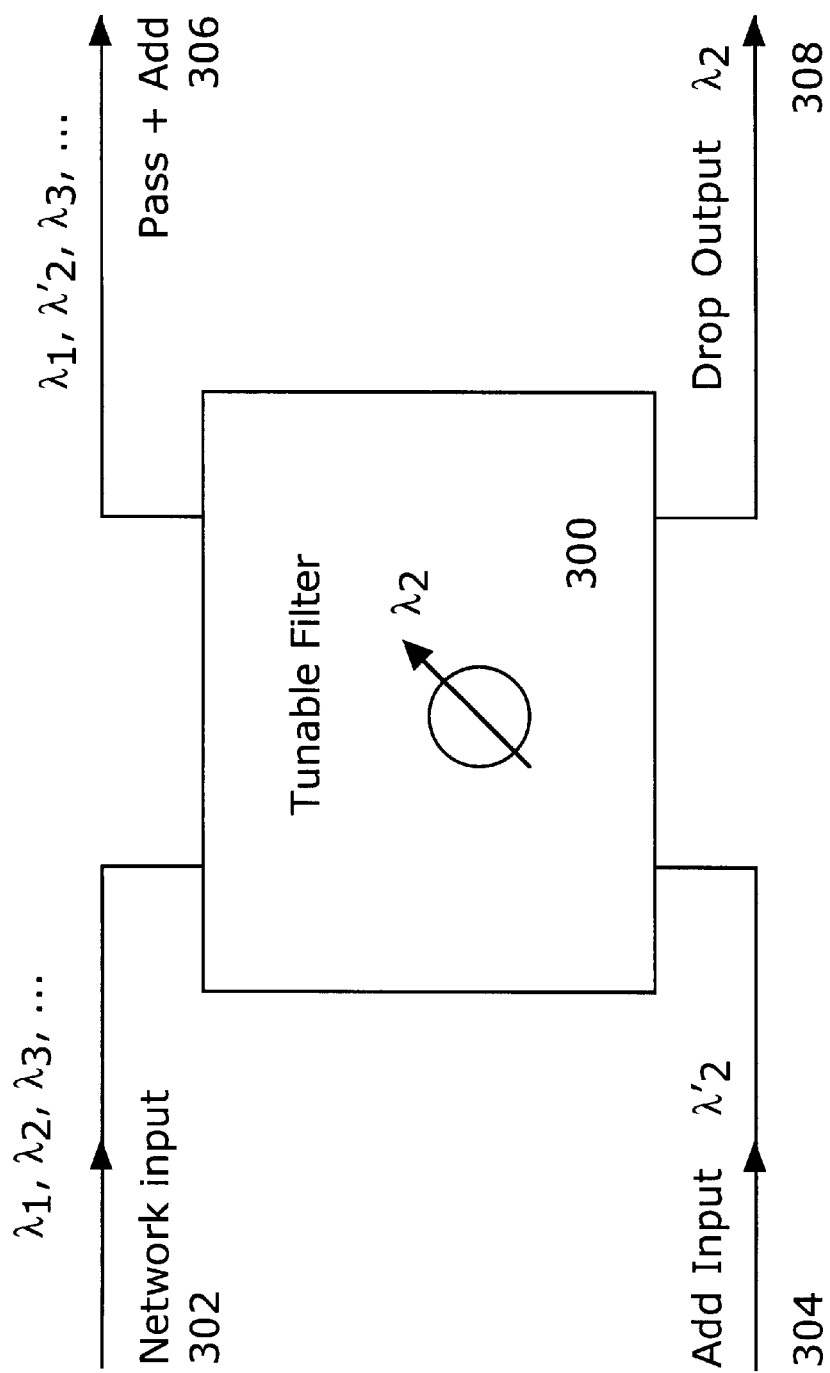
FIG. 3 shows a block diagram of an improved tunable add/drop filter according to the present invention.

FIG. 3 shows a high level block diagram of an improved tunable add/drop filter 300 according to the present invention. Tunable add/drop filter 300 is a 4 port device. Input signals, comprising a plurality of optical signals at distinct wavelengths $\lambda_1, \lambda_2, \lambda_3, \ldots$, enter at network input 302. The signal at one wavelength, for example $\lambda_2$, which is to be selected for by filter 300, appears at drop output port 308. A new signal $\lambda_2'$, at wavelength $\lambda_2$, may be inserted at add input port 304. Output signals which appear at pass+add port 306 comprise signals $\lambda_1, \lambda_2', \lambda_3, \ldots$ (If $\lambda_2'$ is inserted at port 304). Thus, the pass signals are all of the signals not selected for by filter 300, i.e. $\lambda_1, \lambda_3, \ldots$ The add signal (if used) is $\lambda_2'$.

Filter 300 comprises a series of stages similar to the stages of the Lyot filter 200 shown in FIG. 2 (Prior Art). Filter 300 has the high finesse of a Lyot filter 200, without its corresponding loss of light and lack of a complimentary output. The filter is precisely tuned using a cascade of low precision phase shifters, each of which need only be capable of, at most, a one wavelength shift with a precision of no better than 10%. The free spectral range of the filter is determined freely by one stage of the filter, and the finesse increases as $2^N$, where N is the number of stages. Thus, a moderate number of stages (8 or 9) are sufficient to cover the entire WDM band with high selectivity.

Examples of the stages of filter 300 are shown in FIGS. 4–8.

Figure 4:
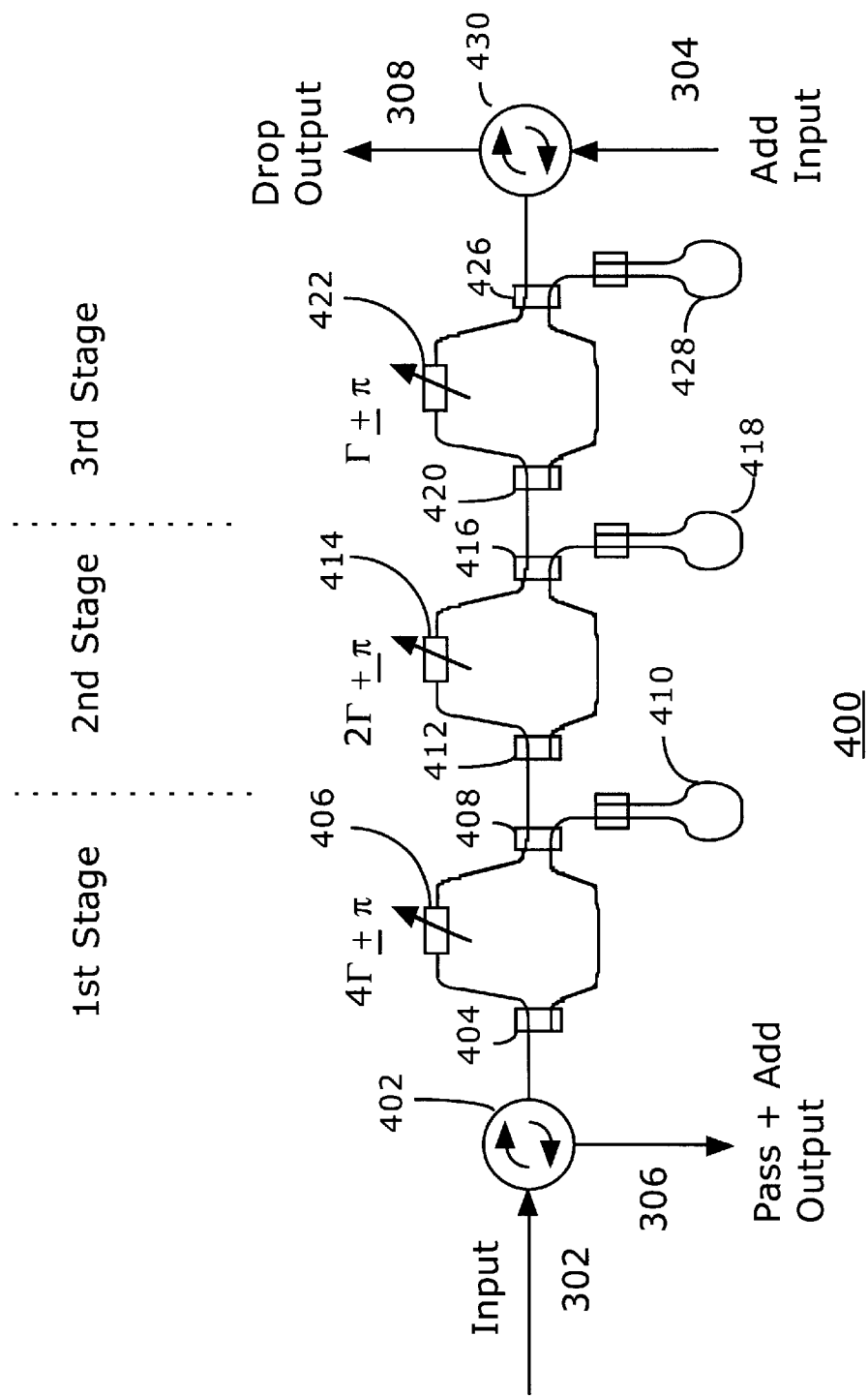
FIG. 4 shows a first embodiment comprising a fiber implementation of a tunable add/drop filter according to the present invention.

FIG. 4 shows a first embodiment comprising a fiber implementation of a tunable add/drop filter 300a according to the present invention. Add/drop filter 300a has the same combined input signal 302, pass+add signal 306, drop signal 308, and add input 304 as described with respect to FIG. 3.

To understand the operation of filter 400, consider that each stage of filter 400 is a fiber Mach Zender interferometer, if fiber mirrors 410, 418, and 428 are removed. Thus, like the Lyot filter of FIG. 2, filter 400 drops half of the channels at each stage and passes the other half. The dropped channels appear at mirrors 410, 418, and 428. In a Mach Zender interferometer, the signals at 410, 418, and 428 would be outputs. But in the present invention, these signals are reflected back to form part of the pass signal 306.

Thus, input signal 302 comprises a plurality of optical signals at distinct wavelengths $\lambda_1, \lambda_2, \lambda_3, \ldots$ Circulator 402 provides this combined input signal to the network, and provides reflected signals as pass+add output 306. Couplers 404, 408, 412, 416, 420, and 426 are a 50/50 coupler, meaning that each provides 50% of the signal to the upper branch and 50% to the lower branch. These couplers are what divide the signal so that bands may be selected for.

For example, in the first stage, input signal 302 encounters coupler 404, which divides the light between the upper branch and the lower branch of the first stage. The signal in the upper branch passes through block 406, which applies a path difference, phase delay, of $4\Gamma$ ($+/-\pi$) to the light, while the signal in the lower branch does not have a phase delay applied. 50/50 coupler 408 sends half of the light on to 50/50 coupler 412 and half down into mirror 410. The delay applied by block 406 is selected such that coupler 408 passes either the even bands it encounters or the odd bands. $4\Gamma+\pi$ selects one set while $4\Gamma-\pi$ select the other set.

The second stage operates similarly to the first. Coupler 412 divides the light into it between the upper branch and the lower branch of the second stage. The signal in the upper branch passes through block 414, which applies a path difference of $2\Gamma$ ($+/-\pi$) to the light, while the signal in the lower branch does not have a phase delay applied. Coupler 416 sends half of the light on to coupler 420 and half down into mirror 418. The delay applied by block 414 is selected such that coupler 416 passes either the even bands it encounters or the odd bands.

Finally, in the third stage, coupler 420 divides the light into it between the upper branch and the lower branch of the third stage. The signal in the upper branch passes through block 422, which applies a path difference of $\Gamma$ ($+/-\pi$) to the light, while the signal in the lower branch does not have a phase delay applied. Coupler 426 sends half of the light on to circulator 430 and half down into mirror 428. The delay applied by block 422 is selected such that coupler 426 passes either the even bands it encounters or the odd bands.

As an example, suppose that the input signal 302 contained signals $\lambda_1, \lambda_2, \lambda_3, \lambda_4, \lambda_5, \lambda_6, \lambda_7,$ and $\lambda_8$. If drop output $\lambda_6$ were desired, the stages would pass the bands as follows:

Stage 1: $\lambda_2, \lambda_4, \lambda_6,$ and $\lambda_8$
Stage 2: $\lambda_2$ and $\lambda_6$
Stage 3: $\lambda_6$ The other bands are reflected back by the fiber mirrors 410, 418, and 428.

The path difference applied by each stage changes by a factor of two, though this may be fine tuned to achieve certain objectives, such as flatter bandpass. Numerically optimizing the filter is one way to systematically achieve such objectives. The phase shifters 406, 414, 422 are normally capable of shifting the phase of the light passing through them by±π, where π is the approximate wavelength of the center of the filter FSR.

Add input 304 is routed by circulator 430 back to the network. The simplest example is to assume that input 304 is also at $\lambda_6$, call it $\lambda_6'$. Then the add input $\lambda_6'$ passes back through the network the same way $\lambda_6$ passed forward.

Figure 5:
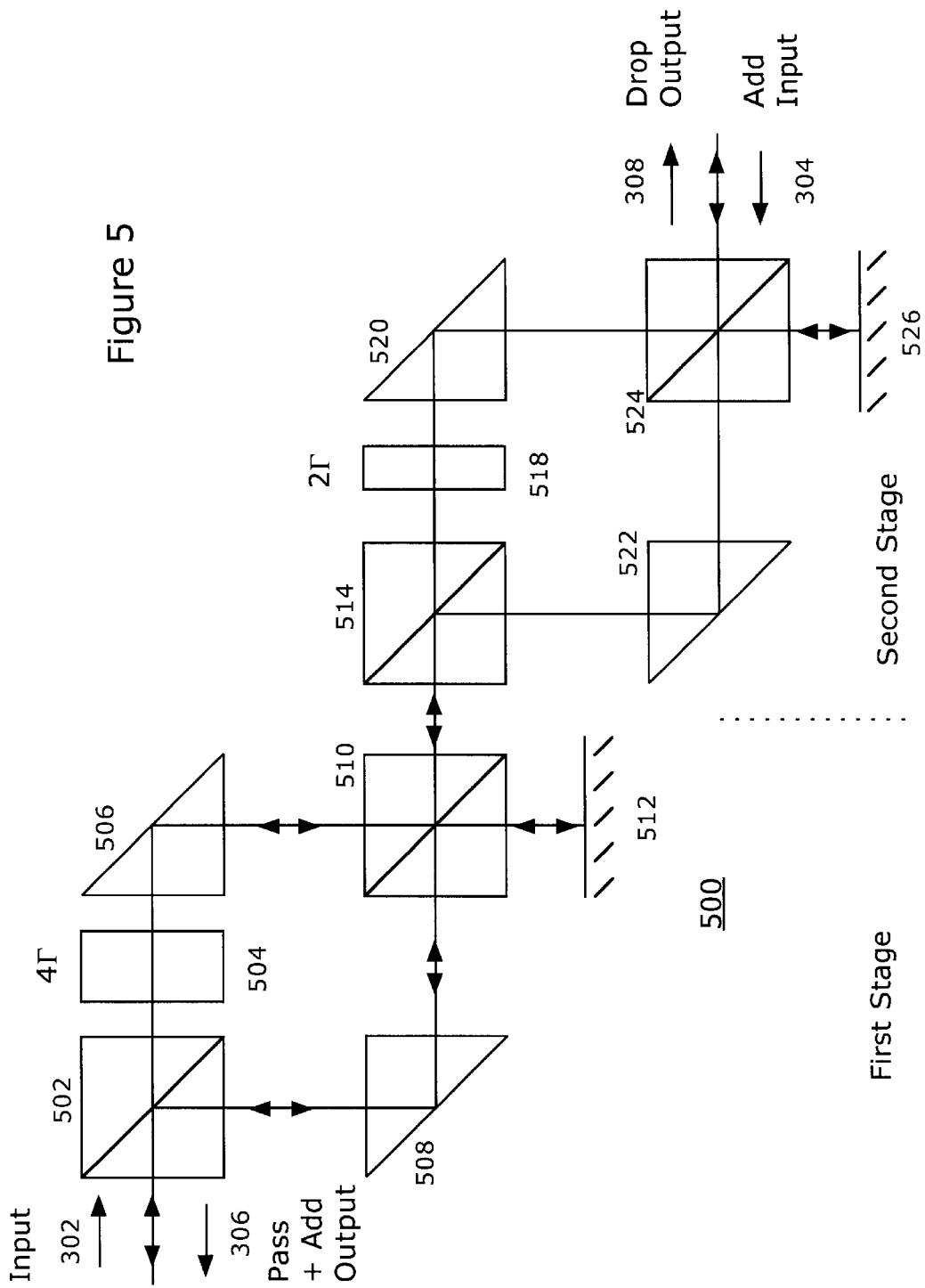
FIG. 5 shows a second embodiment comprising a bulk optics tunable add/drop filter according to the present invention.

FIG. 5 shows a second embodiment comprising a bulk optics tunable add/drop filter 500 according to the present invention. Again, each stage is a Mach Zender interferometer, if 512 and 526 are ignored. Mirrors 512 and 526 act to reflect the passed channels back to join the pass+add output 306. Note that circulators as shown in FIG. 3 are required at each end of filter 500 to enable the adding and dropping of channels.

Stage 1 comprises beam splitters 502 and 510, prism mirrors 506 and 508, mirror 512, and delay block 504, which adds a delay of 4Γ. Thus, light at beam splitter 510 either cancels out, and therefore reflects back to pass+add output 306, or combines to continue to stage 2.

Stage 2 comprises beam splitters 514 and 524, prism mirrors 520 and 522, mirror 526, and delay block 518, which adds a delay of 2Γ. Thus, light at beam splitter 524 either cancels out, and therefore reflects back to pass+add output 306, or combines to continue to drop output 308. Add input 304 travels back through filter 500 the same way the drop output travelled forward.

Figure 6:
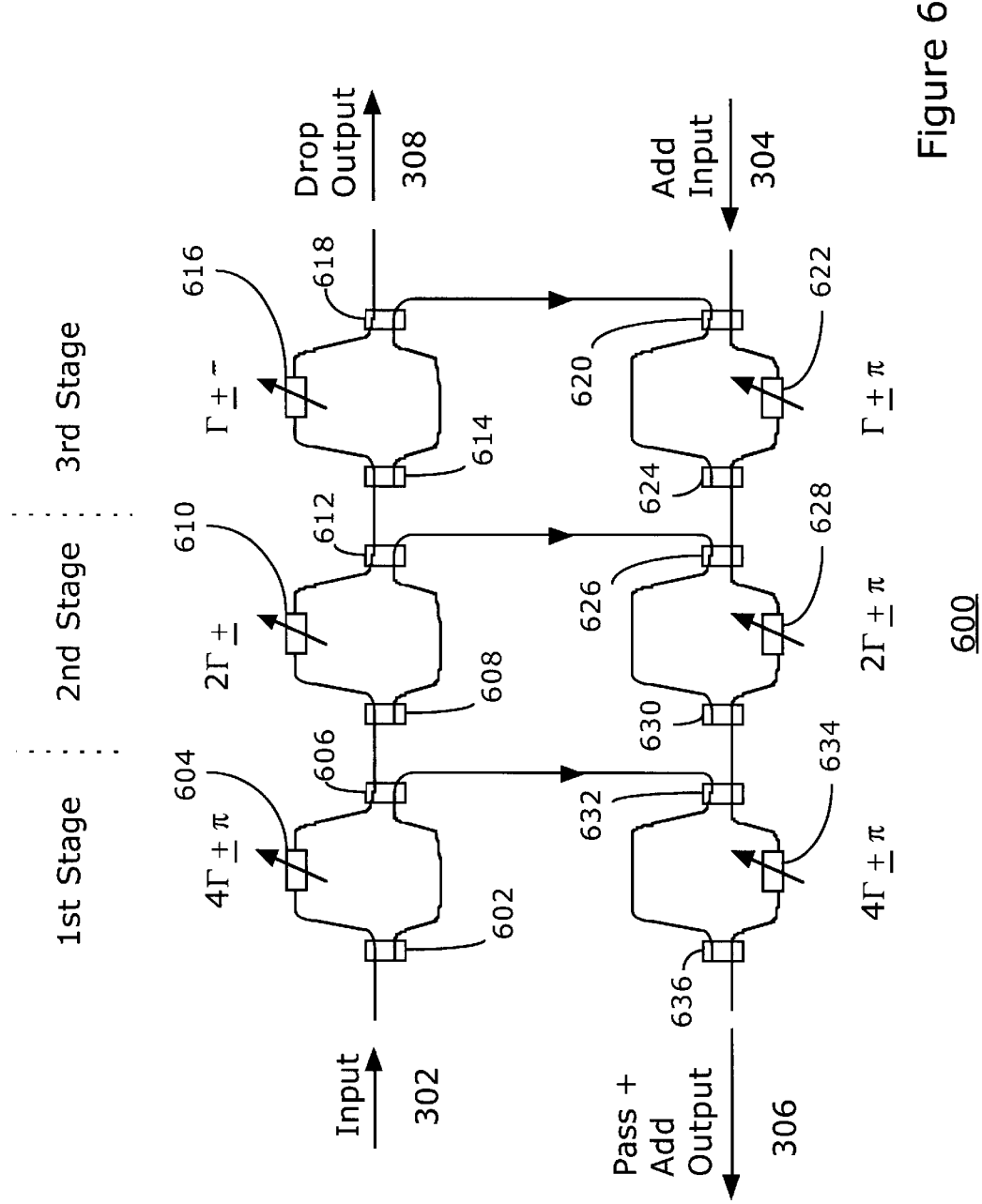
FIG. 6 shows a third embodiment comprising an add/drop filter without circulators according to the present invention.

FIG. 6 shows a third embodiment comprising an add/drop filter 600 without circulators according to the present invention. Filter 600 operates in a similar manner to filter 400 of FIG. 4, and thus similar reference numbers are used to indicate similar elements. However each stage, instead of having a mirror to reflect passed channels back has a return stage to send the pass channel along a separate path. Return stage 1 comprises couplers 632 and 636 and adjustable delay 634. Return stage 2 comprises couplers 630 and 626 and adjustable delay 628. Return stage 3 comprises couplers 620 and 624 and adjustable delay 622. Preferably delays 604 and 634 are controlled together, as are each delay in the other stages. Add input 304 enters return stage 3, and pass+add output 306 comes out of return stage 1.

Figure 7:
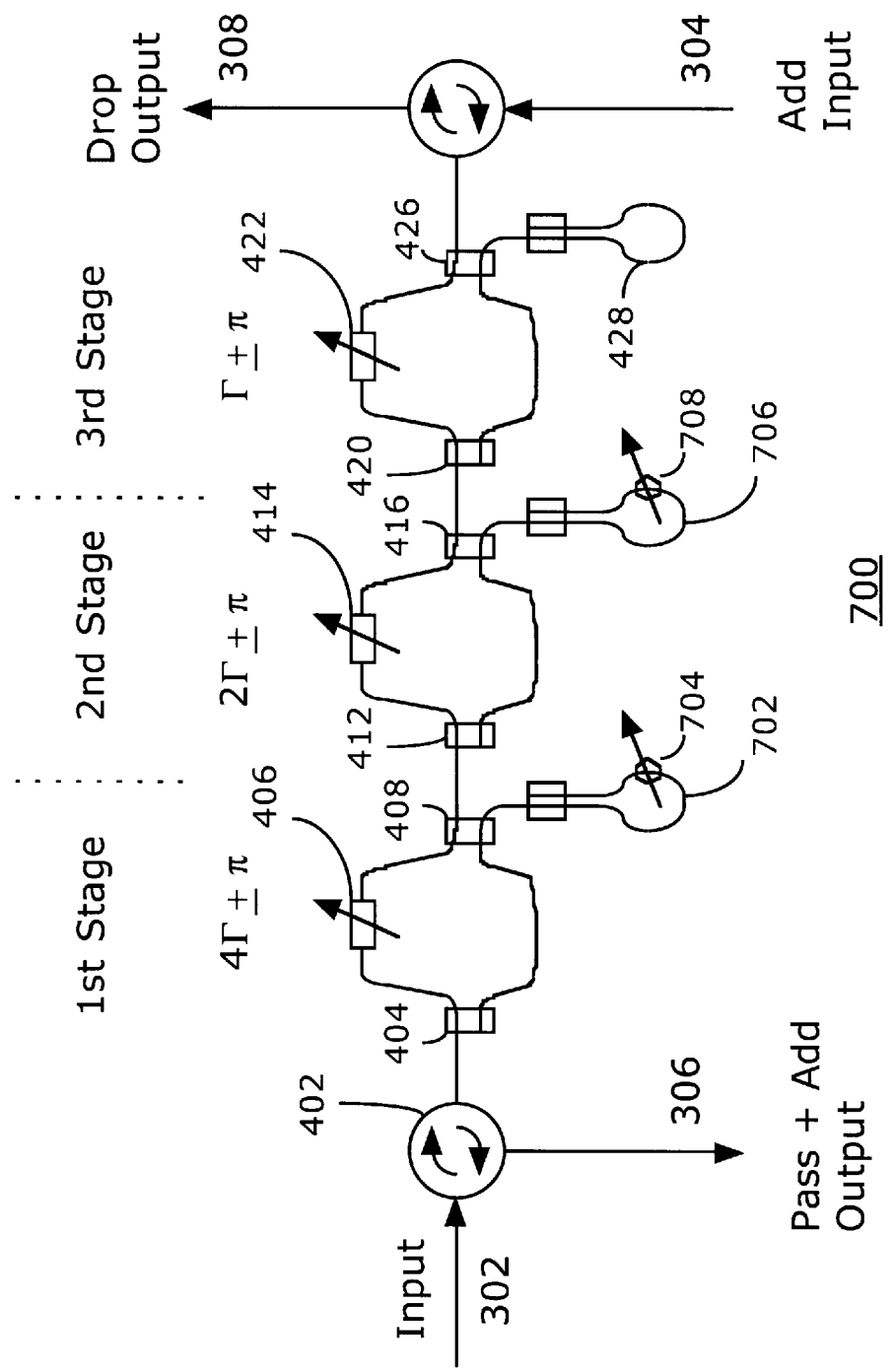
FIG. 7 shows a fourth embodiment of a tunable add/drop filter according to the present invention, configured to compensate for delays.

FIG. 7 shows a fourth embodiment of a tunable add/drop filter 700 according to the present invention, configured to compensate for delays. Again, its operation is similar to filter 400, so similar reference numbers are used for similar elements. The difference appears in the fiber mirrors 702 and 706. Each includes a variable delay element, which is used to ensure that returned pass+add signals arrive at the same time. In other words, the delays synchronize the bands. Delay 704 is the longest.

FIG. 8 shows a fifth embodiment of a tunable add/drop filter 800 according to the present invention, comprising a modified Lyot filter. The stages comprise Lyot filters, as shown in FIG. 2a, replacing the polarizers with polarizing beam splitters 802, and adding mirrors 803 facing the perpendicular output of the polarizing beam splitters in order to reflect the light back into the filter. Only input signal 810 and drop signal 812 are shown here. Note that circulators such as those shown in FIG. 4, or other elements such as the return stages of FIG. 6, are required to enable the input, add, drop, and pass+add ports.

Those skilled in the art will appreciate that various modifications to the exemplary embodiments are within the scope of the patent. For example, the technique of eliminating the need for circulators by using return stages paired with the stages, shown in FIG. 6, can be used with any of the embodiments. The fiber mirrors of FIG. 4 could be replaced with standard mirrors. The stages could be built with planar optical wave circuits, rather than fiber or bulk optics.

What is claimed is:

1. A tunable drop filter having an input port, a drop port, and an output port and comprising:

a device for providing an input signal consisting of channels to the input port;

a plurality of filter stages connected to the input port, each filter stage operating to selectively transmit either even or odd channels and reflect either odd or even channels respectively;

a device for providing reflected channels as a pass signal at the output port; and a device for providing a transmitted channel at the drop port.

2. The filter of claim 1, further comprising:

an add port connected to the filter stages;

a device for providing an add signal at the add port such that the add signal follows the reverse path of the drop signal; and a device for combining the add signal and the pass signal at the output port.

3. The filter of claim 2, wherein each filter stage comprises:

a fiber Mach Zender interferometer having a selective delay for transmitting the selected channels; and a mirror for reflecting any channels not transmitted by the fiber Mach Zender interferometer.

4. The filter of claim 3, wherein the device for providing reflected channels as a pass signal at the output port and the device for providing an add signal at the add port such that the add signal follows the reverse path of the drop signal comprise circulators.

5. The filter of claim 2, wherein each filter stage further comprises:

a delay applied to any reflected channels, the delay selected to synchronize the pass signal channels.

6. The filter of claim 2, wherein each stage comprises:

a bulk optics Mach Zender interferometer having a selective delay for transmitting the selected channels; and a mirror for reflecting channels not transmitted by the bulk optics Mach Zender interferometer.

7. The filter of claim 6, wherein the device for providing reflected channels as a pass signal at the output port and the device for providing an add signal at the add port such that the add signal follows the reverse path of the drop signal comprise circulators.

8. The filter of claim 2, wherein each stage comprises:

a selective delay block;

a polarizing beam splitter adjacent to the delay block for transmitting the selected channels; and a mirror for reflecting channels not transmitted by the polarizing beam splitter.

9. The filter of claim 1, wherein each filter stage comprises:

a fiber Mach Zender interferometer having a selective delay for transmitting the selected channels; and a mirror for reflecting channels not transmitted by the fiber Mach Zender interferometer.

10. The filter of claim 9, wherein the device for providing reflected channels as a pass signal at the output port and the device for providing an add signal at the add port such that the add signal follows the reverse path of the drop signal comprise circulators.

11. The filter of claim 9, wherein each filter stage further comprises:
a delay applied to any reflected channels, the delay selected to synchronize the pass signal channels.

12. The filter of claim 1, wherein each stage comprises:
a bulk optics Mach Zender interferometer having a selective delay for transmitting the selected channels; and
a mirror for reflecting channels not transmitted by the bulk optics Mach Zender interferometer.

13. The filter of claim 12, wherein the device for providing reflected channels as a pass signal at the output port and the device for providing an add signal at the add port such that the add signal follows the reverse path of the drop signal comprise circulators.

14. The filter of claim 2, wherein each stage comprises:
a selective delay block;
a polarizing beam splitter adjacent to the delay block for transmitting the selected channels; and
a mirror for reflecting channels not transmitted by the polarizing beam splitter.

15. A tunable add/drop filter having an input port, an output drop port, an input add port and an output pass+add port and comprising:
a device for providing an input signal consisting of channels to the input port;
a plurality of filter stages connected to the input port, each filter stage operating to selectively transmit either even or odd channels and reflect either odd or even channels respectively;
a device for providing reflected channels as a pass signal at the output port;
a device for providing a transmitted channel at the drop port;
a device for providing an add signal at the add port such that the add signal follows the reverse path of the drop signal; and
a device for combining the add signal and the pass signal at the pass+add output port.

16. The filter of claim 15, wherein each filter stage comprises:
a fiber Mach Zender interferometer having a selective delay for transmitting the selected channels; and
a mirror for reflecting any channels not transmitted by the fiber Mach Zender interferometer.

17. The filter of claim 15, wherein each filter stage comprises:
a bulk optics Mach Zender interferometer having a selective delay for transmitting the selected channels; and
a mirror for reflecting channels not transmitted by the bulk optics Mach Zender interferometer.

18. The filter of claim 15, wherein each stage comprises:
a selective delay block;
a polarizing beam splitter adjacent to the delay block for transmitting the selected channels; and
a mirror for reflecting channels not transmitted by the polarizing beam splitter.

19. The method of selectively passing and dropping channels from an input signal, the method comprising the steps of:
(a) selectively transmitting either even or odd channels and reflect either odd or even channels respectively;
(b) for the transmitted channels, repeating step (a) for as many stages as required to reflect all desired channels;
(c) providing reflected channels as a pass signal; and
(d) providing a transmitted channel as the drop signal at the drop port.

20. The method of claim 19, further comprising the steps of:
providing an add signal at the add port such that the add signal follows the reverse path of the drop signal; and
combining the add signal and the pass signal.

21. The method of claim 19, further including the step of:
applying a delay to each reflected channel, the delays selected to synchronize the pass signal channels.

22. A tunable drop filter having an input port, a drop port, and an output port and comprising:
means for providing an input signal consisting of channels to the input port;
a plurality of filter stages connected to the input port, each filter stage operating to selectively transmit either even or odd channels and reflect either odd or even channels respectively;
means for providing reflected channels as a pass signal at the output port; and
means for providing a transmitted channel at the drop port.

23. The filter of claim 22, further comprising:
an add port connected to the filter stages;
means for providing an add signal at the add port such that the add signal follows the reverse path of the drop signal; and
means for combining the add signal and the pass signal at the output port.

* * * * *